(12) United States Patent
Shao et al.

(10) Patent No.: US 12,284,738 B2
(45) Date of Patent: *Apr. 22, 2025

(54) METHOD AND SYSTEM FOR PARAMETER ADJUSTMENT OF STREET LAMPS IN SMART CITY BASED ON INTERNET OF THINGS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yongzeng Liang, Chengdu (CN); Xiaojun Wei, Chengdu (CN); Zhihui Wen, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 19 days.

This patent is subject to a terminal disclaimer.

(21) Appl. No.: 18/463,274

(22) Filed: Sep. 7, 2023

(65) Prior Publication Data

US 2023/0422379 A1 Dec. 28, 2023

Related U.S. Application Data

(63) Continuation of application No. 18/049,616, filed on Oct. 25, 2022, now Pat. No. 11,800,621.

(30) Foreign Application Priority Data

Sep. 29, 2022 (CN) .......................... 202211195298.7

(51) Int. Cl.
 *H05B 47/11* (2020.01)
 *H05B 47/125* (2020.01)
(52) U.S. Cl.
 CPC ........... *H05B 47/11* (2020.01); *H05B 47/125* (2020.01)

(58) Field of Classification Search
 CPC .... H05B 47/11; H05B 47/125; H05B 47/115; H05B 47/19; H05B 47/105; Y02B 20/40;
 (Continued)

(56) References Cited

U.S. PATENT DOCUMENTS 11,612,028 B2 * 3/2023 Chen ...................... G06Q 10/20
11,800,621 B2 * 10/2023 Shao .................. H05B 47/1965
(Continued)

FOREIGN PATENT DOCUMENTS

CN 102752922 A 10/2012
CN 103702485 A 4/2014
(Continued)

OTHER PUBLICATIONS

First Office Action in Chinese Application No. 202211195298.7 mailed on Nov. 11, 2022, 16 pages.
(Continued)

*Primary Examiner* — Raymond R Chai
(74) *Attorney, Agent, or Firm* — METIS IP LLC

(57) ABSTRACT

The embodiments of the present disclosure provide a method and a system for parameter adjustment of street lamps in a smart city based on an Internet of Things, the method is realized by the system, which includes a user platform, a service platform, a management platform, a sensor network platform and an object platform, the method is executed by the management platform, comprising: issuing a data acquisition instruction to receive road images acquired by the object platform; issuing a parameter determination instruction to determine irradiation intensities of the street lamps on a road based on the road images; acquiring navigation routes of vehicles by communicating with navigation systems of the vehicles; determining road segments where the vehicles are coming and estimated times when the vehicles arrive at the road segments; and adjusting
(Continued)

the irradiation intensities of the street lamps at the road segments in a preset time in advance.

20 Claims, 6 Drawing Sheets

(58) Field of Classification Search
CPC .... G06Q 50/26; G06V 10/774; G06V 20/588; G16Y 10/35; G16Y 20/20; G16Y 40/30
See application file for complete search history.

(56) References Cited

U.S. PATENT DOCUMENTS

| | | | |
|---|---|---|---|
| 2012/0038490 A1* | 2/2012 | Verfuerth | G08G 1/0145 340/917 |
| 2012/0206051 A1* | 8/2012 | Nieuwlands | H05B 47/19 315/153 |
| 2014/0001961 A1 | 1/2014 | Anderson et al. | |
| 2016/0150622 A1* | 5/2016 | Flinsenberg | H05B 47/175 315/297 |

FOREIGN PATENT DOCUMENTS

| | | |
|---|---|---|
| CN | 106476678 A | 3/2017 |
| CN | 106895836 A | 6/2017 |
| CN | 111328165 A | 6/2020 |
| CN | 111970785 A | 11/2020 |
| CN | 114040553 A | 2/2022 |
| CN | 114418468 A | 4/2022 |
| EP | 3851801 A1 | 7/2021 |
| JP | 2017123332 A | 7/2017 |
| KR | 100841386 B1 | 6/2008 |
| WO | 2018232906 A1 | 12/2018 |

OTHER PUBLICATIONS

Notification to Grant Patent Right for Invention in Chinese Application No. 202211195298.7 mailed on Dec. 12, 2022, 7 pages.
Zhang, Hongzheng, Road Lighting System in the Construction of Smart City, Chinese Master's Theses Full-text Database Engineering Technology, 2018, 91 pages.

* cited by examiner

100

400

```
         ┌─────────────────────────────────────┐  410
         │ Determining lanes where objects on  │
         │ the road are located and forward    │
         │ directions of the objects based on  │
         │ the road images                     │
         └──────────────────┬──────────────────┘
                            │
                            ▼                     420
         ┌─────────────────────────────────────┐
         │ Determining a first target area     │
         │ based on the lanes and the forward  │
         │ directions of the objects           │
         └──────────────────┬──────────────────┘
                            │
                            ▼                     430
         ┌─────────────────────────────────────┐
         │ Adjusting at least the irradiation  │
         │ intensities of the street lamps in  │
         │ the first target area               │
         └─────────────────────────────────────┘
```

FIG. 4

METHOD AND SYSTEM FOR PARAMETER ADJUSTMENT OF STREET LAMPS IN SMART CITY BASED ON INTERNET OF THINGS

CROSS-REFERENCE TO RELATED APPLICATIONS

The application is a continuation of U.S. application Ser. No. 18/049,616, filed on Oct. 25, 2022, which claims priority to Chinese Patent Application No. 202211195298.7, filed on Sep. 29, 2022, the contents of each of which may be hereby incorporated by reference to its entirety.

TECHNICAL FIELD

The present disclosure generally relates to Internet of Things, and in particular, to a method and a system for parameter adjustment of street lamps in a smart city based on an Internet of Things (IoT).

BACKGROUND

Street lamps are distributed on all roads in the city. They are used to provide lighting when the natural light is insufficient and facilitate the passage of pedestrians and vehicles. They are indispensable infrastructure in the city. However, at present, most of the street lamps are turned on in fixed periods, and the maximum brightness is always maintained in the whole lighting period. However, in some periods or segments, the traffic flow and pedestrian flow are very small, so it is not necessary to always maintain a high lighting intensity.

Therefore, it is necessary to provide a method and a system for parameter adjustment of street lamps in a smart city based on an Internet of Things (IoT).

SUMMARY

One or more embodiments of the present disclosure provide a method for parameter adjustment of street lamps in a smart city based on an Internet of Things (IoT). The method is realized by a system for parameter adjustment of street lamps in the smart city based on the IoT, the system for parameter adjustment of street lamps in the smart city based on the IoT includes a user platform, a service platform, a management platform, a sensor network platform and an object platform, the method is executed by the management platform, comprising: issuing a data acquisition instruction to receive road images acquired by the object platform through the sensor network platform, and the object platform including a first sensor; issuing a parameter determination instruction to determine irradiation intensities of the street lamps on a road based on the road images; acquiring navigation routes of vehicles by communicating with navigation systems of the vehicles; determining road segments where the vehicles are coming and estimated times when the vehicles arrive at the road segments based on the navigation routes; and adjusting the irradiation intensities of the street lamps at the road segments in a preset time in advance according to the estimated times.

One or more embodiments of the present disclosure provide a system for parameter adjustment of street lamps in a smart city based on an Internet of Things (IoT). The system includes a user platform, a service platform, a management platform, a sensor network platform and an object platform, and the management platform is configured to: issue a data acquisition instruction to receive road images acquired by the object platform through the sensor network platform, and the object platform including a first sensor; issue a parameter determination instruction to determine irradiation intensities of the street lamps on a road based on the road images; acquire navigation routes of vehicles by communicating with navigation systems of the vehicles; determine road segments where the vehicles are coming and estimated times when the vehicles arrive at the road segments based on the navigation routes; and adjust the irradiation intensities of the street lamps at the road segments in a preset time in advance according to the estimated times.

One or more embodiments of the present disclosure provide a non-transitory computer-readable storage medium, which stores computer instructions, when the computer instructions are executed by a processor, a method for parameter adjustment of street lamps in a smart city based on an Internet of Things (IoT) is implemented, the method comprising: by a management platform, issuing a data acquisition instruction to receive road images acquired by the object platform through the sensor network platform, and the object platform including a first sensor; by the management platform, issuing a parameter determination instruction to determine irradiation intensities of the street lamps on a road based on the road images; by the management platform, acquiring navigation routes of vehicles by communicating with navigation systems of the vehicles; by the management platform, determining road segments where the vehicles are coming and estimated times when the vehicles arrive at the road segments based on the navigation routes; and by the management platform, adjusting the irradiation intensities of the street lamps at the road segments in a preset time in advance according to the estimated times.

BRIEF DESCRIPTION OF THE DRAWINGS

The present disclosure will be further described in the form of exemplary embodiments, which will be described in detail by the accompanying drawings. These embodiments are not restrictive. In these embodiments, the same number represents the same structure, wherein:

FIG. 4 is an exemplary flow chart of a method for adjusting irradiation intensities of street lamps according to some embodiments of the present disclosure;

DETAILED DESCRIPTION

In order to more clearly explain the technical scheme of the embodiments of the present disclosure, the following will briefly introduce the drawings that need to be used in the description of the embodiments. Obviously, the drawings in the following description are only some examples or embodiments of the present disclosure. For those skilled in the art, the present disclosure can also be applied to other similar scenarios according to these drawings without creative work. Unless it is obvious from the language environment or otherwise stated, the same label in the figure represents the same structure or operation.

It should be understood that the "system", "device", "unit" and/or "module" used herein is a method for distinguishing different components, elements, parts or assemblies at different levels. However, if other words can achieve the same purpose, they can be replaced by other expressions.

As shown in the description and the claims, unless the context expressly indicates exceptions, the words "a", "an", "the", "one", and/or "this" do not specifically refer to the singular forms, but may also include the plural forms; and the plural forms may be intended to include the singular forms as well, unless the context clearly indicates otherwise. Generally speaking, the terms "include," "including," "includes," "comprising," "comprise," and/or "comprises" only indicate that the steps and elements that have been clearly identified are included, and these steps and elements do not constitute an exclusive list. Methods or equipment may also include other steps or elements.

Flowchart are used in this disclosure to explain the operation performed by the system according to the embodiment of the present disclosure. It should be understood that the previous or subsequent operations are not necessarily performed accurately in order. Instead, the steps may be processed in reverse order or simultaneously. At the same time, other operations may be added to these processes, or one or more steps may be removed from these processes.

Figure 1:
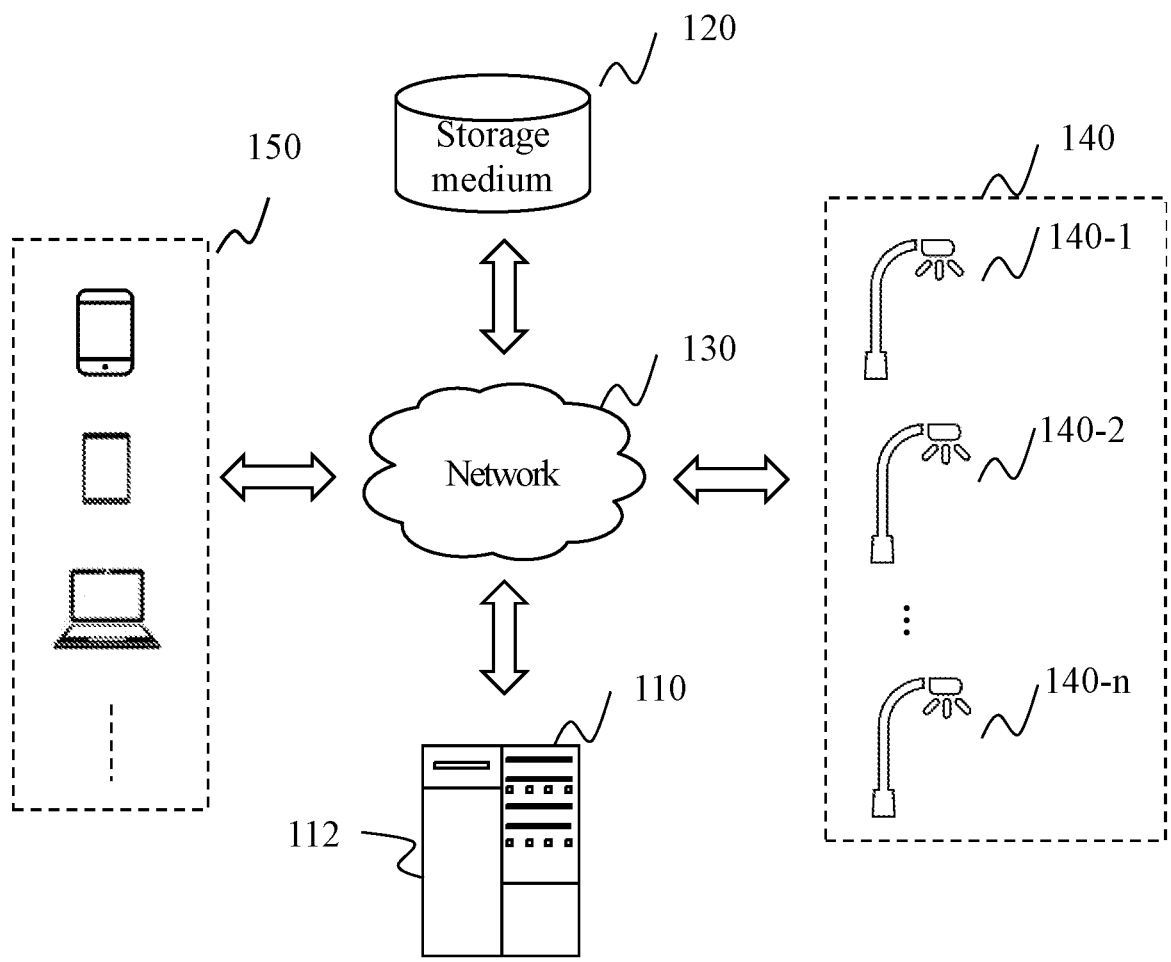
FIG. 1 is a schematic diagram of an application scenario of a system for controlling intelligent street lamps in a smart city based on an Internet of Things according to some embodiments of the present disclosure.

FIG. 1 is a schematic diagram of an application scenario of a system for controlling intelligent street lamps in a smart city based on an Internet of Things according to some embodiments of the present disclosure.

As shown in FIG. 1, the application scenario 100 of the system for controlling intelligent street lamps in a smart city based on an Internet of Things may include a server 110, a storage device 120, a network 130, a street lamp 140, and a user terminal 150.

In some embodiments, the system for controlling intelligent street lamps in a smart city based on the Internet of Things may determine irradiation intensities of street lamps on a road according to ambient light intensities and road environment information. For example, the system for controlling intelligent street lamps in a smart city based on the Internet of Things may determine lanes and directions of objects on the road according to road images and adjust the irradiation intensities of the street lamps in its area.

The server 110 may be a single server or a group of servers. In some embodiments, the server 110 may include a processing device 112, which may be configured to process information and/or data related to the application scenario 100 of the system for controlling intelligent street lamps in a smart city based on the Internet of Things. For example, the processing device 112 may access information and/or data stored in the user terminal 150 and/or the storage device 120 via the network 130.

In some embodiments, the processing device 112 may access the road information stored in the user terminal 150 via the network 130, and send a control command to the street lamps 140 via the network 130 based on processing of the road information to determine the irradiation intensities of the street lamps 140 on the road.

The storage device 120 may be configured to store data and/or instructions. In some embodiments, the storage device 120 may store the road information acquired by the user terminal 150. In some embodiments, the storage device 120 may store data and/or instructions of the exemplary system for controlling intelligent street lamps in a smart city based on the Internet of Things described in the present disclosure.

The network 130 may connect various components of the system and/or connect the system with external resources. The network 130 may enable communication between various components, as well as with other components outside the system, to facilitate the exchange of data and/or information.

The street lamp 140 may include one or more street lamps 140-1, 140-2, . . . 140-n. In some embodiments, the irradiation intensities of the street lamps 140 may be changed.

The user terminal 150 may include one or more terminals or software used by a user. In some embodiments, the user may be an owner of the user terminal 150. In some embodiments, the user terminal 150 may include a mobile device, a tablet computer, a notebook computer, a wearable intelligent terminal, or any combination thereof. In some embodiments, the user may obtain relevant information of street lamp management through the user terminal 150.

It should be noted that the application scenario 100 is provided for illustrative purposes only and is not intended to limit the scope of the present application. For those of ordinary skill in the art, various modifications or changes may be made according to the description of the present disclosure. For example, the application scenario 100 may further include an information source. However, these changes and modifications may not depart from the scope of the present disclosure.

Figure 2:
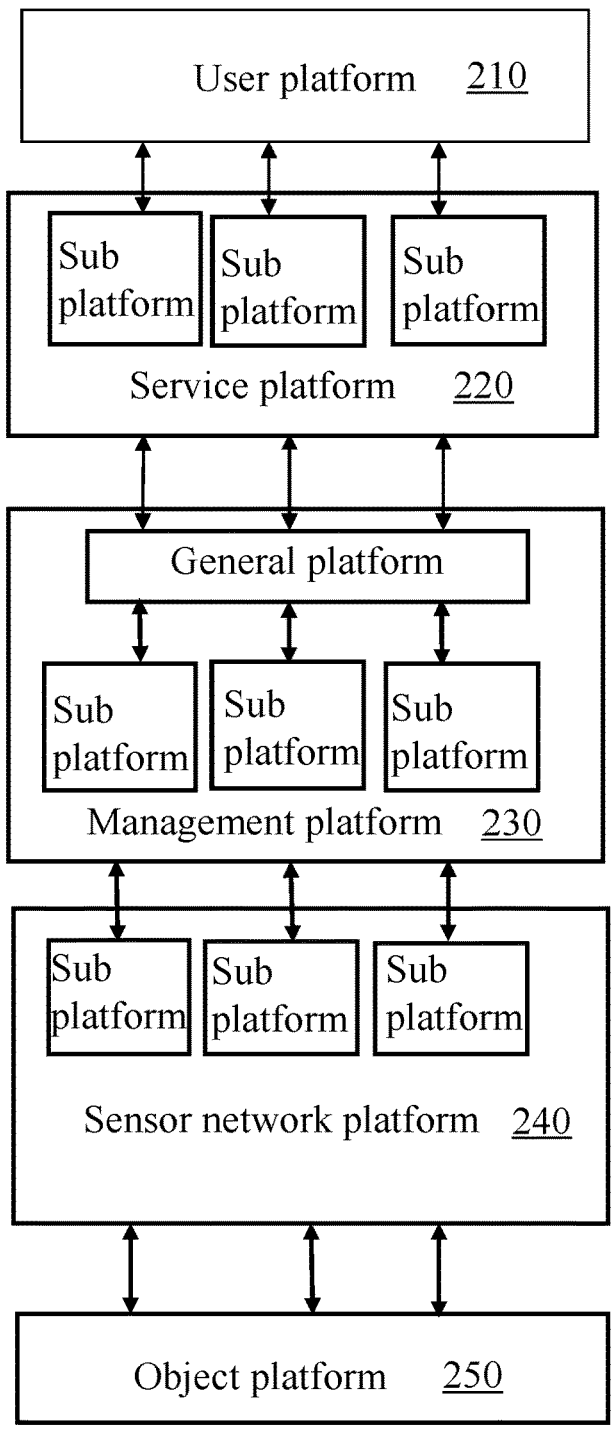
FIG. 2 is an exemplary structural diagram of a system for controlling intelligent street lamps in a smart city based on an Internet of Things according to some embodiments of the present disclosure.

FIG. 2 is an exemplary structural diagram of a system for controlling intelligent street lamps in a smart city based on an Internet of Things according to some embodiments of the present disclosure. As shown in FIG. 2, the system for controlling intelligent street lamps in a smart city 200 based on the Internet of Things may include a user platform 210, a service platform 220, a management platform 230, a sensor network platform 240, and an object platform 250. In some embodiments, the system for controlling intelligent street lamps in a smart city 200 based on the Internet of Things may be a part of or implemented by the server 110.

In some embodiments, the system for controlling intelligent street lamps in a smart city 200 based on the Internet of Things may be applied to a variety of application scenarios such as street lamp management. In some embodiments, the system for controlling intelligent street lamps in a smart city 200 based on the Internet of Things may obtain road information. In some embodiments, the system for controlling intelligent street lamps in a smart city based on the Internet of Things 200 may control the irradiation intensities of the street lamps based on the processing of the road information.

A variety of scenarios for street lamp management may include the control of the irradiation intensities of street lamps such as urban roads and urban communities. It should be noted that the above scenarios are only examples and do not limit the specific application scenarios of the system for controlling intelligent street lamps in a smart city based on the Internet of Things 200. Those skilled in the art may apply the system for controlling intelligent street lamps in a smart city based on the Internet of Things 200 to any other suitable scenarios on the basis of the contents disclosed in the embodiments.

Hereinafter, the system for controlling intelligent street lamps in a smart city based on the Internet of Things 200 will be described in detail.

The user platform 210 may be a user-oriented service interface configured as a terminal device. In some embodiments, the user platform 210 may receive information from a user. For example, the user platform 210 may receive a query instruction of a street lamp management policy from a user. In some embodiments, the user platform 210 may feed back the street lamp management policy to the user. In some embodiments, the user platform 210 may interact with the service platform 220. For example, the user platform 210 may send a query instruction of a street lamp management policy to the service platform 220. As another example, the user platform 210 may receive the street lamp management policy uploaded by the service platform 220. As used herein, the street lamp management policy may include distribution position information of the street lamps.

The service platform 220 may be a platform that preliminarily processes street lamp related data and configured as a first server. In some embodiments, the server platform 220 may adopt independent layout. The independent layout may mean that the service platform 220 includes a plurality of sub platforms of the service platform, and different sub platforms may be used for data storage, data processing and/or data transmission of street lamp related data in different areas. In some embodiments, the service platform 220 may interact with the management platform 230. For example, the service platform 220 may send the street lamp management policy query instruction to the management platform 230. As another example, the service platform 220 may receive the street lamp management policy uploaded by the management platform 230. In some embodiments, the sub platform of the service platform may also be referred to as a service sub platform.

The management platform 230 may refer to the Internet of Things platform that plans as a whole and coordinates the contact and cooperation among various functional platforms and provides perception management and control management. In some embodiments, the management platform 230 may be configured as a second server. In some embodiments, the management platform 230 may be configured to execute a method for smart city street lamp management. In some embodiments, the management platform 230, in response to the street lamp management policy query instruction sent by the service platform 220, processes the street lamp related data uploaded by the sensor network platform 240 to determine the street lamp management policy. Among them, the street lamp related data may include a count of street lamps in different areas, a brightness adjustment strategy of the street lamps, and so on.

In some embodiments, the management platform 230 may adopt a combined front sub platform layout. The combined front sub platform layout may mean that the management platform 230 is provided with a general platform of the management platform and a plurality of sub platforms of the management platform (including its own database). The plurality of sub platforms of the management platform may respectively store and/or process the street lamp related data of different areas sent by the sensor network platform 240. The general platform may store and/or process data of the plurality of sub platforms of the management platform after summarizing, and transmit the data to the service platform 220. The sub platforms of the management platform may be set based on the street lamp related data in different areas. Each sub platform of the management platform may have a corresponding sub platform of the sensor network platform.

The data acquired by the object platform may be uploaded to a corresponding sub platform of the sensor network platform. After being processed by the corresponding sub platform of the sensor network platform, the data is uploaded to a corresponding sub platform of the management platform. For example, the sub platform of the management platform may include sub platforms of urban area A, sub platforms of urban area B, and sub platforms of urban area C.

In some embodiments, each sub platform of the management platform may receive the street lamp related data of each area from the corresponding sub platform of the sensor network platform, and each sub platform of the management platform may process and operate the street lamp related data of each area. For example, the street lamp related data of each street lamp in the urban area A may be uploaded to each sub platform of a street lamp management platform in the urban area A for management. In some embodiments, each sub platform of the street lamp management platform (including own database of each sub platform) may further upload processed data to the general platform of the management platform, and the general platform of the management platform may upload summarized processed data to the service platform. As used herein, data uploaded to the server may include street lamp management policies.

In some embodiments, a general management platform may also be referred to as the general platform of the management platform, and a management sub platform may also be referred to as the sub platform of the management platform.

In some embodiments, the management platform 230 may interact with the sensor network platform 240. The management platform 230 may send an instruction to acquire street lamp related data to the sensor network platform 240. In some embodiments, the management platform 230 may receive and process the street lamp related data of each area uploaded by the sensor network platform 230.

In some embodiments of the present disclosure, the street lamp related data in different areas may be processed by the management sub platform and then summarized into a general database, which may reduce a data processing pressure of the entire management platform, and also collect data of each independent sub platform for unified management. In addition, sub platform databases and a general database may belong to the government, so that the government can uniformly grasp the overall situation of urban street lamp management.

The sensor network platform 240 may be a platform for realizing interaction between the management platform and the object platform. In some embodiments, the sensor network platform 240 may be arranged independently and include a plurality of sensor network sub platforms, which may correspond to a plurality of management sub platforms in one-to-one relationship. In some embodiments, the sensor network sub platform may be divided according to urban areas. For example, the sub platforms of the sensor network platform may include the sub platforms of urban area A, the sub platforms of urban area B, and the sub platforms of urban area C.

In some embodiments, the sensor network platform 240 may be configured as a communication network and a gateway, and each sensor network sub platform may be configured with an independent gateway. In some embodiments, each sub platform of the sensor network may acquire the street lamp related data uploaded from the object platform, and process and operate it. For example, data of the street lamps and related sensing devices deployed in urban area A are uploaded to the sensor network sub platform in the urban area A for processing. In some embodiments, the sensor network sub platform may upload the processed street lamp related data to a database of a corresponding management sub platform.

In some embodiments, the sensor network platform 240 may interact with the object platform 250. The sensor network platform 240 may send an instruction to acquire the street lamp related data to the object platform 250. In some embodiments, the sensor network platform 240 may receive and process the street lamp related data uploaded by the object platform 250.

In some embodiments, the sensor network sub platform may also be referred to as a sub platform of the sensor network platform.

The object platform 250 may be a functional platform that senses information generation and controls the final execution of information. In some embodiments, the object platform 250 may be configured as a functional platform composed of at least one street lamp and related sensor devices (such as camera devices). Among them, each of at least one street lamp and related sensor device may be configured with a unique number, which may be used to manage street lamps deployed in different areas of the city. The related sensor device may include a light sensor for acquiring the ambient light intensity. The relevant sensor device may further include a camera for acquiring a road image.

In some embodiments, the object platform 250 may interact with the sensor network platform 240, receive an instruction to acquire the street lamp related data issued by the sensor network sub platform, and upload the street lamp related data to the corresponding sensor network sub platform.

For those skilled in the art, after understanding the principle of the system, it is possible to transfer the system for controlling intelligent street lamps in a smart city 200 based on the Internet of Things to any other suitable scenario without departing from this principle.

It should be noted that the above description of the system and its components is only for convenience of description and cannot limit the present disclosure to the scope of the embodiments. It can be understood that, for those skilled in the art, after understanding the principle of the system, it is possible to arbitrarily combine various components without departing from this principle, or to connect the constituent subsystem with other components. For example, each component may share a storage device, and each component may have its own storage device. Such deformation is within the scope of protection of the present disclosure.

Figure 3:
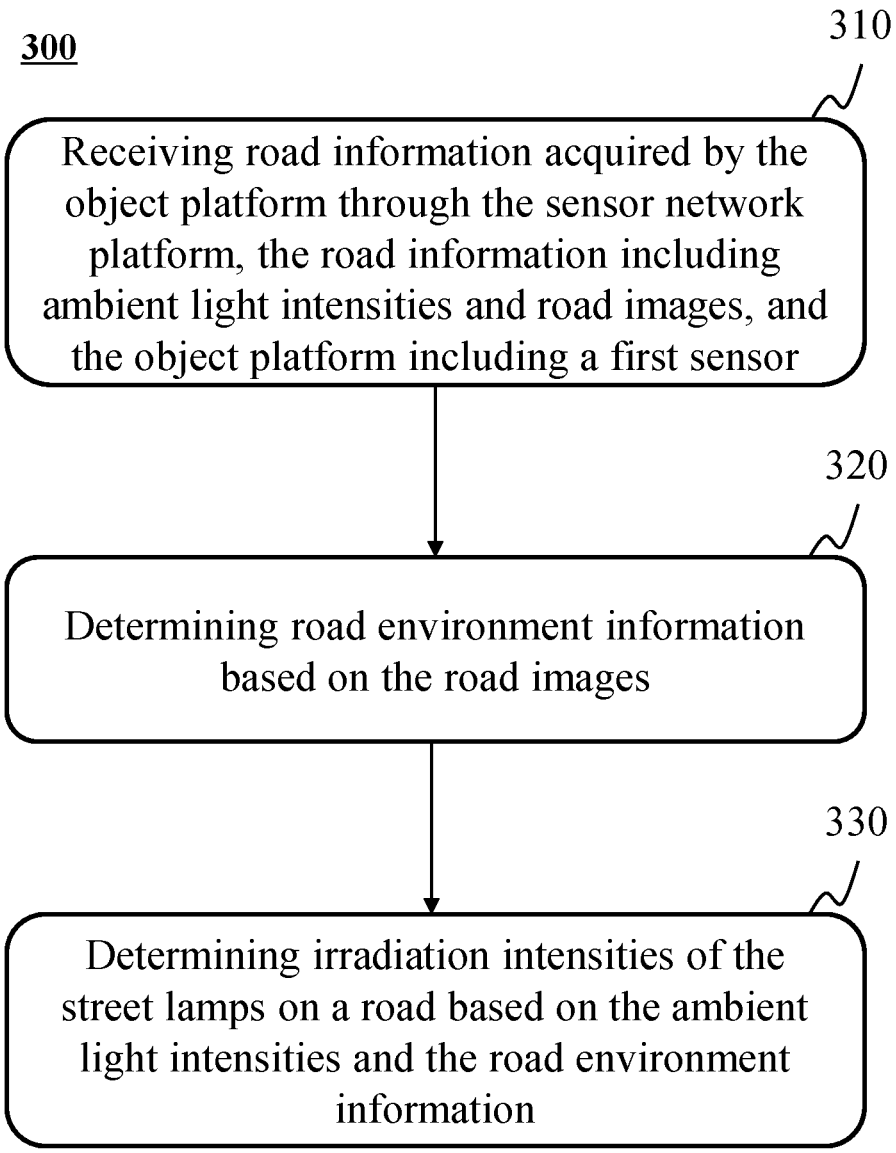
FIG. 3 is an exemplary flowchart of determining irradiation intensities of street lamps on a road according to some embodiments of the present disclosure.

FIG. 3 is an exemplary flowchart of determining irradiation intensities of street lamps on a road according to some embodiments of the present disclosure. As shown in FIG. 3, the process 300 may include the following steps. In some embodiments, the process 300 may be executed by the management platform 230.

In step 310, receiving road information acquired by the object platform through the sensor network platform, the road information including ambient light intensities and road images, and the object platform including a first sensor.

The road information may refer to information related to roads. In some embodiments, the road information may include the ambient light intensities and the road images. The road information may be acquired based on a first sensor in the object platform, and the first sensor may include a light sensor and an image sensor. The first sensor may be deployed on a road, on a street lamp of a road or any other position.

An ambient light intensity may refer to the light intensity of the environment where the road is located. The ambient light intensity may be expressed by a luminous flux (unit, Lux) of visible light received per unit area or in other ways. For example, the ambient light intensity on the road at a certain time may be 100 Lux. The ambient light intensity may be acquired based on ambient light data collected by the light sensor.

The road images may refer to captured images including road screens. The road images may be acquired based on pictures including the road acquired by the image sensor (e.g., camera).

In step 320, determining road environment information based on the road images.

The road environment information may refer to information related to the environment of the road that may affect driving. In some embodiments, the road environment information may include visibility, a count of obstacles on the road that affect traffic (for example, fault warning signs on a certain Lane).

In some embodiments, the management platform 230 may determine the road environment information through a first image recognition model based on the road images. The first image recognition model may be a machine learning model. An input of the first image recognition model may be a road image and an output of the first image recognition model may be the road environment information. The first image recognition model may be acquired by training. First training samples may be historical road images, and the labels of the first training samples are road environment information corresponding to the historical road images. The first training samples may be acquired based on historical data. Labels of the first training samples may be acquired by manual labeling.

In step 330, determining irradiation intensities of the street lamps on a road based on the ambient light intensities and the road environment information.

An irradiation intensity may refer to an intensity of the light emitted by a road lamp onto a road surface. The irradiation intensity may be expressed as an average luminous flux (unit, Lux) irradiated onto the road surface. For example, the irradiation intensity of a street lamp may be 60 Lux.

In some embodiments, in response to the ambient light intensity being greater than or equal to a first threshold, the irradiation intensities of the street lamps on the road may be determined to be 0 lux, that is, the irradiation of the street lamps may be turned off.

In some embodiments, in response to the ambient light intensity being less than the first threshold, the irradiation intensities of the street lamps on the road may be determined by a preset rule based on the ambient light intensity and the road environment information. For example, the preset rule may be: the lower the ambient light intensity, the lower the visibility, the more the count of obstacles, and the greater the irradiation intensities of the street lamps.

In some embodiments, the management platform may acquire historical traffic accident data of the road, and determine an irradiation time and corresponding irradiation intensities of the street lamps based on the historical traffic road data. As used herein, the historical traffic data may at least include road segments with high incidence of traffic accidents and time periods with high incidence of traffic accidents. The management platform may control the street lamps of the road segments to be always on during the time periods based on the road segments and time periods with high incidence of traffic accidents at night, and increase the irradiation intensities to reduce a frequency of traffic accidents at night and improve the safety of vehicles driving at night.

In some embodiments, the management platform may also adjust the irradiation intensities of the street lamps in other ways. For example, the management platform may determine lanes where objects on the road are located and forward directions of the objects based on the road images, determine a first target area based on the lanes and the forward directions, and at least adjust the irradiation intensities of the street lamps in the first target area. The management platform may determine turn signal states of the objects on the road based on the road images. The management platform may determine a second target area based on the turn signal states. The management platform may at least adjust the irradiation intensities of the street lamps in the second target area. The management platform may adjust the irradiation intensities of the street lamps based on whether there is an object on the road, and reduce the irradiation intensities of the street lamps when there is no object in a certain time range. The management platform may also determine the irradiation intensities of street lamps according to historical traffic accident data, and strengthen the irradiation intensities of street lamps at the road segments and time periods with high incidence of traffic accidents.

Figure 5:
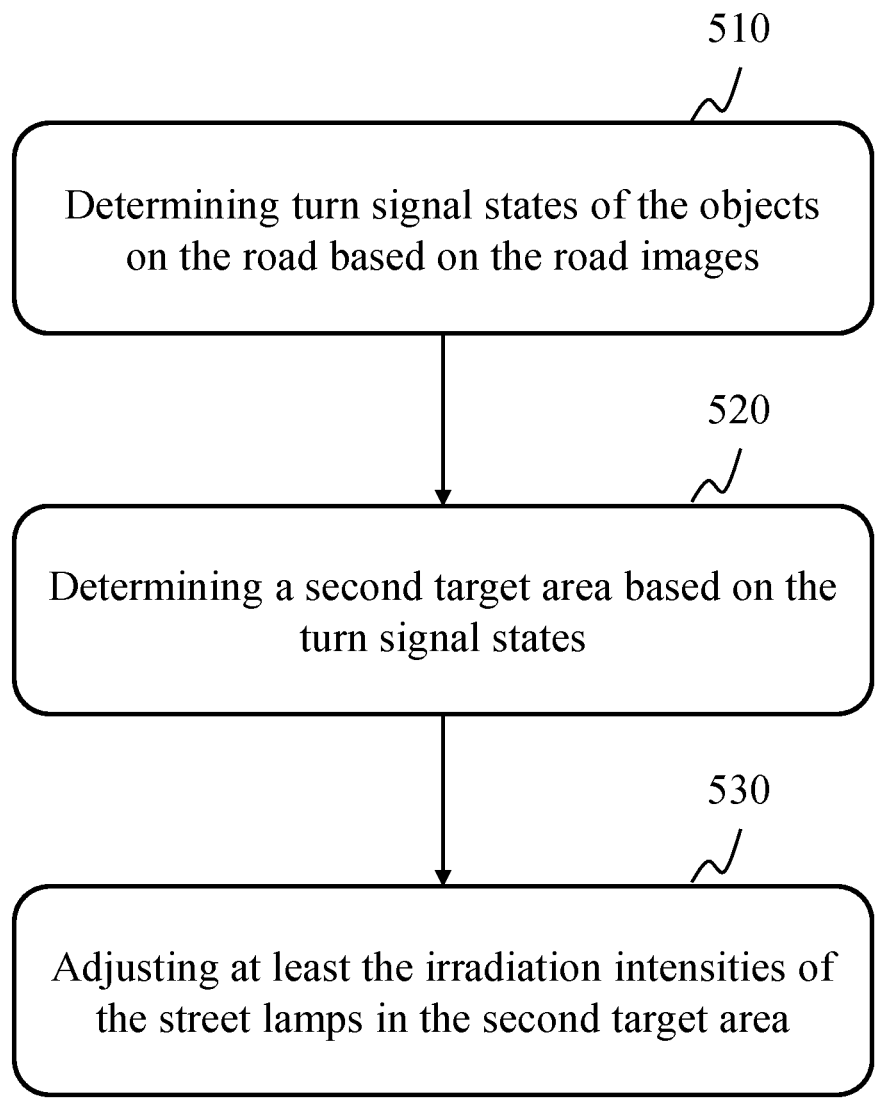
FIG. 5 is another exemplary flow chart of a method for adjusting irradiation intensities of street lamps according to some embodiments of the present disclosure.
Figure 6:
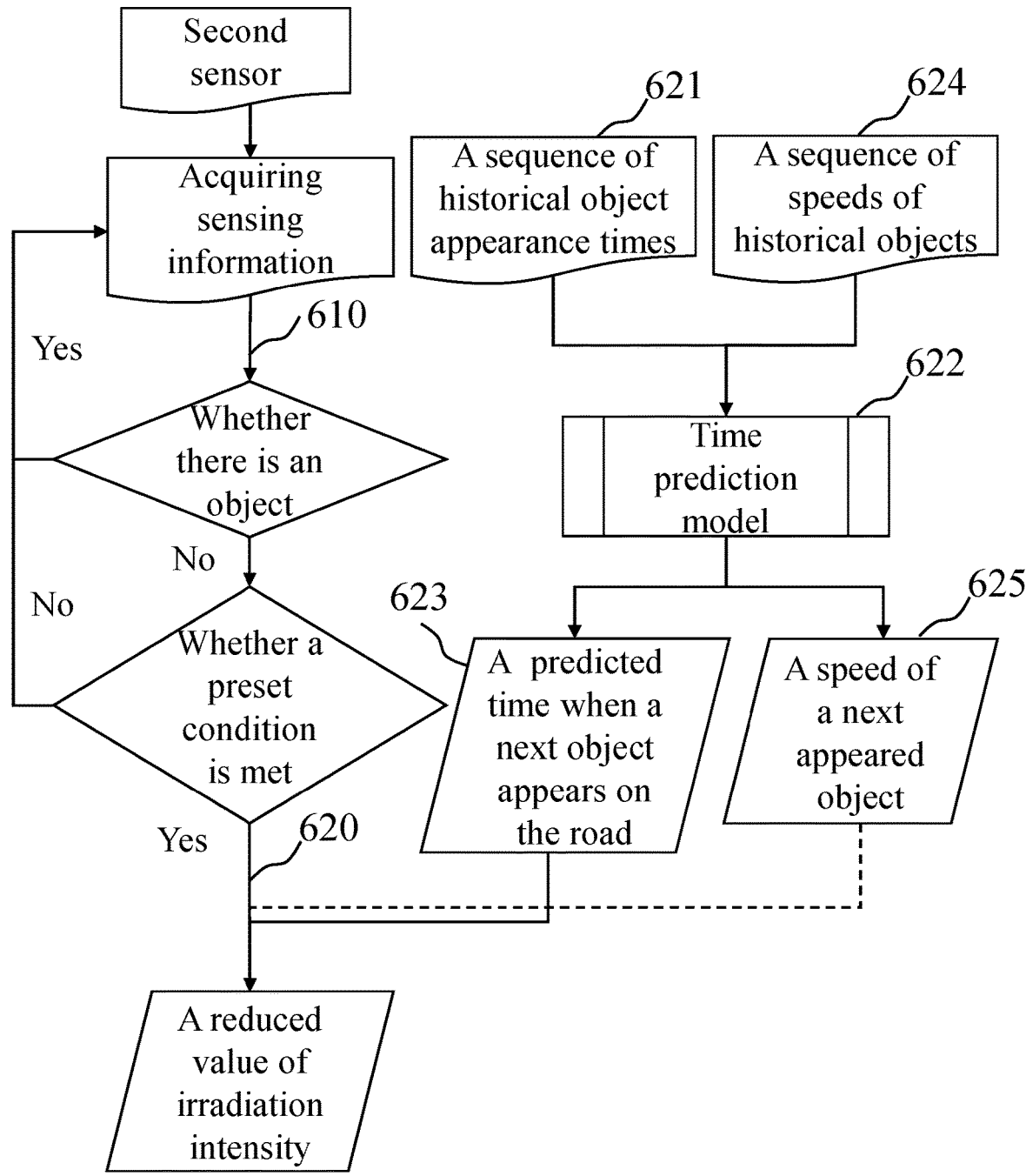
FIG. 6 is another exemplary flowchart of a method for adjusting irradiation intensities of street lamps according to some embodiments of the present disclosure.

More information about adjusting the irradiation intensities of street lamps can be explained in other parts of the present disclosure (for example, FIG. 4, FIG. 5, and FIG. 6).

After the management platform 230 calculates the irradiation intensities of the street lamps, it may send an adjustment instruction to the object platform through the sensor network sub platform in a corresponding area to adjust the irradiation intensities of the street lamps in the area.

In some embodiments of the present disclosure, by acquiring the road environment information through the first sensor, the street lamps may be turned off when the ambient light intensity is large (for example, in the daytime), and the irradiation intensities of the street lamps may be intelligently increased when the road conditions are poor. By reasonably configuring the irradiation intensities of the street lamps according to road conditions, power resources can be effectively saved and a lighting effect can be ensured.

FIG. 4 is an exemplary flow chart of a method for adjusting irradiation intensities of street lamps according to some embodiments of the present disclosure. As shown in FIG. 4, the process 400 may include the following steps. In some embodiments, the process 400 may be executed by the management platform 230.

In step 410, determining lanes where objects on the road are located and forward directions of the objects based on the road images.

The objects on the road may include vehicles, pedestrians and the like on the road. A lane may refer to a current lane of an object on the road. The lane may include a motor vehicle lane, a non-motor vehicle lane a sidewalk and so on. The lane may be represented by serial numbers (e.g., Lane 1, Lane 2, etc.) or other ways based on preset rules (e.g., sorting from left to right). In some embodiments, the lane may be segmented based on a preset distance (e.g., 10 m), and each segment of the lane may be represented by a serial number (e.g., segment 1, segment 2, etc.) or other means. In some embodiments, the lane may further include a lane and a lane segment where the objects are currently located. For example, the lane of a certain object on the road is expressed as (1, 2), which means that the object is currently located in segment 2 of the Lane 1.

The forward directions may refer to directions of the objects on the road. The forward directions may be expressed based on a preset rule (for example, a direction of the lane extension is expressed as 1, and the opposite direction of the direction is 0) or other ways.

In some embodiments, the management platform may determine the lanes and the forward directions of the objects on the road through a second image recognition model based on the road image.

The second image recognition model may be a machine learning model. An input of the second image recognition model may be a road image, and an output of the second image recognition model may be the lanes and the forward directions of the objects on the road. In some embodiments, the output of the second image recognition model may include lanes and forward directions where a plurality of objects on the road are located. In some embodiments, the output of the second image recognition model may further include a count of objects on the road. In some embodiments, the input of the second image recognition model may be a sequence of road images composed of a plurality of frames before and after a current time, and the output of the second image recognition model may also include speeds of objects on the road.

In some embodiments, the second image recognition model may be acquired by training. Second training samples used for a training of the second image recognition model may be historical road images (or a sequence of historical road images), and labels of the second training samples may be lanes where the objects in the historical road images are located, forward directions of the objects, a count of the objects, and forward speeds of the objects. The second training samples may be acquired based on historical data, and the labels may be acquired by manual labeling.

In step 420, determining a first target area based on the lanes and the forward directions of the objects.

The first target area may refer to an area determined based on preset extension sections of the lanes and the forward directions where the objects on the road are located. A preset extension section may refer to at least one segment of a lane determined based on a forward direction. For example, if the object is currently in a third segment of a certain lane and the forward direction is 1, the preset extension sections may be fourth and fifth segments of the lane.

In some embodiments, an area formed by at least one preset extension section of at least one lane where at least one object is located on the road and at least one forward direction of the at least one lane may be determined as the first target area. For example, through the above image recognition, there may be currently two objects on the road, and vectors formed by the lanes and the forward directions may be: (1, 4, 1), (2, 5, 0), then the first target area may include: 4th, 5th and 6th segments of Lane 1, and 5th, 4th, and 3rd segments of Lane 2.

In step 430, adjusting at least the irradiation intensities of the street lamps in the first target area.

In some embodiments, adjusting the irradiation intensities of the street lamps in the first target area may include: determining a first irradiation intensity adjustment value based on the first target area; adjusting at least the irradiation intensities of the street lamps in the first target area based on the first irradiation intensity adjustment value.

The irradiation intensity adjustment value may refer to an absolute value of a difference between an irradiation intensity after adjustment and an irradiation intensity before adjustment. The irradiation intensity adjustment value may be expressed by a value greater than 0 or in other ways. For example, the irradiation intensity adjustment value may be 10 Lux.

In some embodiments, the first irradiation intensity adjustment value may be determined by a preset rule based on the first target area. For example, the preset rule may be that the greater a count of lanes included in the first target area, the greater the first irradiation intensity adjustment value.

In some embodiments, the first irradiation intensity adjustment value may be related to the count of objects in the first target area. In some embodiments, the count of objects in the first target area may be acquired by the second image recognition model. For example, the count of objects on the road output from the second image recognition model may be determined as the count of objects in the first target area. For example, the first irradiation intensity adjustment value may be determined by a following formula:

$$L_1 = k_1 n_1 + k_2 n_2$$

where, $L_1$ is the first irradiation intensity adjustment value, $n_1$ is the count of lanes covered by the first target area, $n_2$ is the count of objects in the first area, $k_1$, $k_2$ are preset parameters for adjusting the first irradiation intensity adjustment value, $k_1$, $k_2$ may be determined based on experience, for example, $k_1$, $k_2$ may both be 1.

In some embodiments of the present disclosure, when calculating the first irradiation intensity adjustment value, by introducing the count of objects, an improvement range of the irradiation intensity can be increased in a case of road congestion, thereby more intelligently reducing the potential risk of traffic accidents.

In some embodiments, the first irradiation intensity adjustment value may also be related to the forward speeds of the objects in the first target area.

In some embodiments, the forward speeds of the objects in the first target area may be acquired by the second image recognition model. For example, the forward speeds of the objects on the road output from the second image recognition model is determined as the forward speeds of the objects in the first target area. For example, the first irradiation intensity adjustment value may be determined by a following formula:

$$L_1 = k_1 n + k_2 m + \frac{k_3}{m} \sum_{i=1}^{m} v_i$$

where, $L_1$ is the first irradiation intensity adjustment value, n is the count of lanes covered by the first target area, m is the count of objects in the first target area, and $v_i$ is a forward speed of an $i^{th}$ object, $k_1$, $k_2$, $k_3$ are preset parameters for adjusting the first irradiation intensity adjustment value, $k_1$, $k_2$, $k_3$ may be determined based on experience, for example, $k_1$, $k_2$, $k_3$ may all be 1.

In some embodiments of the present disclosure, when calculating the first irradiation intensity adjustment value, by introducing the forward speeds of the objects, the improvement range of the irradiation intensity can be increased when speeds of the vehicles on the road are fast, so as to more intelligently reduce the potential traffic accident risk.

In some embodiments, the management platform may send an adjustment instruction to the object platform through the sensor network sub platform in a corresponding area to increase the irradiation intensities of the street lamps in the first target area. As used herein, an increase value of the irradiation intensity may be the first irradiation intensity adjustment value.

In some embodiments, the management platform may also send an adjustment instruction to the object platform through the sensor network sub platform of the corresponding area to reduce or maintain the irradiation intensities of the street lamps outside the first target area. As used herein, in response to reducing the irradiation intensities outside the first target area, a reduction value of the irradiation intensities may be the first irradiation intensity adjustment value or other values.

In some embodiments of the present disclosure, by determining the lanes where the objects on the road are located and the forward directions based on the road images, and finally adjusting the irradiation intensities, the irradiation intensities of the street lamps can be specifically increased in a road segment where there are vehicles or pedestrians, visual field conditions of driving on the lane can be improved, and the occurrence of traffic accidents can be reduced.

FIG. 5 is another exemplary flow chart of a method for irradiation intensities of street lamps according to some embodiments of the present disclosure. As shown in FIG. 5, the process 500 may include following steps. In some embodiments, the process 500 may be executed by the management platform 230.

In step 510, determining turn signal states of the objects on the road based on the road images.

The turn signal states may refer to the turn signal states of the objects (e.g., vehicle) on the road. For example, the states of the turn signal may include: the left turn signal is turned on, a right turn signal is turned on, and the turn signal is not turned on. The turn signal states may be indicated by serial numbers or other means. For example, if the turn signal state is "1", it may mean that a left turn signal is turned on; if the turn signal state is "2", it may mean that a right turn signal is turned on; if the turn signal state is "0", it may mean that the turn signal is not turned on.

In some embodiments, the management platform may determine the turn signal states of the objects on the road through a third image recognition model based on the road images.

The third image recognition model may be a machine learning model. The input of the third image recognition model may be a road image, and the output of the third image recognition model may be a turn signal state of an object on the road. In some embodiments, the output of the third image recognition model may include turn signal states of a plurality of objects on the road.

In some embodiments, the third image recognition model may be acquired by training. Third training samples used for a training of the third image recognition model may be historical road images, and labels of the third training samples may be the turn signal states of the objects in the historical road images. The third training samples may be acquired based on historical data. The labels of the third training samples may be acquired by manual labeling.

In step 520, determining a second target area based on the turn signal states.

The second target area may refer to lanes that the objects will drive into, which may be determined based on lanes where the objects are currently located and the turn signal states. For example, if a turn signal state of an object is "1" (for example, it may mean the right turn signal is turned on), then a possible driving route of the object may be: changing lane to a right lane, turning right to enter a next road, etc., then possible driving lanes of the object may include all the right lanes of a current lane of the object, and all right lanes of a next road after turning right.

In some embodiments, at least one of the possible lanes of at least one object on the road may be determined as the second target area. For example, all possible lanes of the at least one object may be determined as the second target area. For another example, only one of the possible lanes of the at least one object may be determined as the second target area.

In step 530, adjusting at least the irradiation intensities of the street lamps in the second target area.

In some embodiments, adjusting at least the irradiation intensities of the street lamps in the second target area may include determining second irradiation intensity adjustment values based on the second target area. The irradiation intensities of the street lamps in the plurality of second target areas may be at least adjusted based on the second irradiation intensity adjustment values.

In some embodiments, the second irradiation intensity adjustment values of different lanes and lane segments of the different lanes may be determined by a preset rule based on current distances between different lanes and the lane segments of the different lanes in the second target area and an object. For example, the preset rule may be that the closer the distance is, the greater the second irradiation intensity adjustment value of a corresponding lane segment.

In some embodiments, the second irradiation intensity adjustment value may be related to a waiting time of a red light. The waiting time of a red light may refer to a waiting time caused by the red light.

In some embodiments, in response to a lane segment in the second target area being a lane segment into which the object drives through lane change or right turn, the waiting time of a red light corresponding to the lane segment of the lane may be 0.

In some embodiments, in response to a lane segment in the second target area being a lane segment into which the object drives through left turn, U-turn or straight ahead, the waiting time of a red light corresponding to the lane segment of the lane may be determined based on a schedule of traffic lights acquired by the management platform, a current vehicle speed of the object, a distance between the traffic lights and the object, etc.

For example, the second irradiation intensity adjustment value of a certain lane segment of a lane in the second target area may be determined by a following formula:

$$L_2 = \frac{k_1}{d + k_2 t}$$

where, $L_2$ is the second irradiation intensity adjustment value, d is a distance between a nearest object and the lane segment of the lane, t is the waiting time of the red light, $k_1$, $k_2$ are preset parameters for adjusting the second irradiation intensity adjustment value, $k_2$ may be determined based on experience, for example, $k_1$, $k_2$ may both be 1.

In some embodiments, the irradiation intensities of the street lamps in the second target area may be increased. As used herein, an increased value of the irradiation intensity may be a second irradiation intensity adjustment value.

In some embodiments, irradiation intensities of the street lamps outside the second target area may also be reduced or maintained. As used herein, a reduction value of the irradiation intensity may be the second irradiation intensity adjustment value or other values in response to a reduction of the irradiation intensity outside the second target area.

In some embodiments of the present disclosure, when calculating the second irradiation intensity adjustment value, by introducing an object waiting time of the red light, an improvement range of irradiation intensity may be reduced when the waiting time of the red light of vehicles on the road is long, so as to avoid ineffective irradiation of the street lamps and effectively save power resources.

In some embodiments of the present disclosure, the turn signal states of the objects on the road may be determined based on the road images, and finally the irradiation intensities may be adjusted. The irradiation intensities of the street lamps in a corresponding area may be increased in advance according to possible tendencies of the vehicles on the road (turning, going straight, turning), so as to optimize the road driving experience and reduce the occurrence of traffic accidents.

In some embodiments, the management platform may also communicate with a navigation system of the vehicle through an Internet of Things technology to obtain the navigation route of the vehicle, determine a road segment where the vehicle is coming and an estimated time when the vehicle arrives at the road segment based on the navigation route, determine a third irradiation intensity adjustment value, and adjust the irradiation intensities of the street lamps by a preset time in advance according to the estimated time. The third irradiation intensity adjustment value may be one of a preset value, a manually input adjustment value, or one of adjustment values determined according to actual road conditions.

In some embodiments of the present disclosure, by acquiring the navigation route of the vehicles within a preset range, the road segments where the vehicles may come can be judged in advance, so as to adjust the irradiation intensities of specified road segments in advance, which can improve an intelligence of controlling irradiation intensities of the street lamps.

FIG. 6 is another exemplary flowchart of a method for adjusting irradiation intensities of street lamps according to some embodiments of the present disclosure. As shown in FIG. 6, the process 600 may include following steps. In some embodiments, the process 600 may be executed by the management platform 230.

In step 610, judging whether there is an object on the road according to sensing information acquired by a second sensor.

The second sensor may include a pressure sensor. The second sensor may be located in the object platform. In some embodiments, the management platform may receive the sensing information acquired by the second sensors in different areas from different sensor network sub platforms, and the sensing information may include pressure values. The second sensor may be deployed on the road surface or elsewhere. In some embodiments, each lane segment of each lane on the road may include at least one second sensor, which may be configured to determine whether there is an object on the lane segment of the lane.

In some embodiments, whether there is an object on the road may be determined based on the pressure value acquired by the at least one second sensor on the road. For example, the pressure value of each lane segment may be compared with a preset pressure value to determine whether there is an object on the lane segment.

In some embodiments, the management platform may also receive the sensing information acquired by the second sensor and/or the road images acquired by the first sensor in different areas from different sensor network sub platforms to determine whether there is an object on the road.

In step 620, controlling the street lamps on the road to reduce the irradiation intensities in response to an absence of the object on the road and a duration of the absence of the object satisfying a preset condition.

In some embodiments, the preset condition may mean that the duration of the absence of the object may be greater than or equal to a preset value of the duration. The preset value of the duration may be determined based on experience, for example, 5 seconds, 10 seconds, etc.

In some embodiments, the preset condition may be related to a predicted time 623 when a next object appears on the road, and the predicted time may be determined based on the time prediction model 622.

The time prediction model 622 may be a machine learning model. The input of the time prediction model 622 may be a sequence of historical object appearance times 621, and the output of the time prediction model 622 may be the predicted time 623 when a next object appears.

The historical object appearance time may refer to a time when an object appears on the road before a current time. For example, the historical object appearance time may be 20 seconds, which means that an object appeared on the road 20 seconds ago. The sequence of the historical object appearance times may include at least one historical object appearance time. For example, the sequence of the historical object appearance times (250, 210, 100, 40, 10) may indicate that: an object appeared on the road 250 seconds ago, an object appeared on the road 210 seconds ago (not necessarily a same object as an aforementioned object) . . . an object appeared on the road 10 seconds ago.

In some embodiments, the management platform may receive information acquired by the first and/or second sensors in different areas from different sensor network sub platforms to acquire the sequence of historical object appearance times 621.

In some embodiments, an input of the time prediction model 622 may further include a sequence of speeds of historical objects 624, and an output of the time prediction model 622 may further include a speed of a next appeared object 625.

The speed of a historical object may refer to a forward speed of a certain object on the road before a current time. The sequence of speeds of historical objects may include at least one historical object speed. In some embodiments, an object corresponding to a historical object speed in the sequence of speeds of historical objects may be a same object corresponding to a historical object appearance time in a sequence of historical object appearance times, respectively. For example, a sequence of historical object appearance times (250, 210, 100, 40, 10) and a sequence of speeds of historical objects (60, 40, 80, 20, 10) may indicate that an object appeared on the road at a speed of 60 km/h 250 seconds ago, an object appeared on the road at a speed of 40 km/h 210 seconds ago . . . an object appeared on the road at a speed of 10 km/h 10 seconds ago.

In some embodiments, the management platform may receive information of the second sensors from different sensor network sub platforms to obtain a sequence of speeds of historical objects 624.

In some embodiments of the present disclosure, by introducing the sequence of speeds of historical objects, when considering a predicted time when a next object appears, an influence of a speed on an appearance time may be fully considered, and a prediction accuracy can be improved.

In some embodiments, the time prediction model may be trained by training or other methods. Fourth training samples used for a training of the time prediction model may be a sequence of historical arrival times, and a label of a fourth training sample may be a time of appearance of a next object corresponding to the sequence of historical arrival times. The fourth training samples may be acquired based on historical data, and the labels may be acquired by manual labeling.

For example, the preset value of the duration in the preset conditions may be determined by a following formula:

$$T = \frac{k_1}{t} + k_2$$

where, T is the preset value of the duration, t is a predicted time of appearance of a next object, and $k_1$, $k_2$ are preset parameters, used to adjust the preset value of the duration, $k_2$ may be determined based on experience, for example, $k_1$, $k_2$ may both be 1.

In some embodiments, an irradiation intensity reduction value may be determined based on the preset value of the duration and the predicted time of appearance of a next object. For example, the irradiation intensity reduction value may be determined by a following formula:

$$L_3 = k_1 t_1 + k_2 t_2$$

where, $L_3$ is the irradiation intensity reduction value, $t_1$ is the preset value of duration, $t_2$ is the predicted time of the appearance of a next object, $k_1$, $k_2$ are preset parameters for adjusting the irradiation intensity reduction value, $k_1$, $k_2$ may be determined based on experience.

After the management platform 230 calculates the irradiation intensity reduction value of the street lamps, the management platform 230 may send an adjustment instruction to the object platform through the sub platform of the sensor network platform in a corresponding area to adjust the irradiation intensities of the street lamps in the area.

In some embodiments, the irradiation intensity reduction value of the street lamps may be determined based on a gradient reduction value sequence, and the gradient reduction value sequence may be related to the predicted time of the appearance of a next object.

The gradient reduction value sequence may refer to a sequence composed of at least one irradiation intensity reduction value. For example, the gradient reduction value sequence may be (20, 20, 20, 20). In some embodiments, the gradient reduction value sequence may be assigned to the irradiation intensity reduction value of the street lamps in sequence. After the management platform controls the irradiation intensity of the street lamps to reduction based on the irradiation intensity reduction value, the irradiation intensity reduction value may be cleared to zero to wait for a next assignment, so that the irradiation intensities of the street lamps may be reduced in segments. For example, if a current irradiation intensity of the street lamps may be 100 Lux and the gradient reduction value sequence may be (20, 20, 20, 20), then element values in the gradient reduction value sequence may be assigned to the irradiation intensity reduction value of the street lamps at regular intervals, so that the irradiation intensities of the street lamps may be reduced by 20 Lux at regular intervals.

In some embodiments, lowest intensity values of the irradiation intensities of the street lamps may be set. When the irradiation intensities of the street lamps are controlled to be reduced based on the irradiation intensity reduction value, if the irradiation intensities of the street lamps have been reduced to the lowest intensity values, the irradiation intensities of the street lamps may not be reduced any more.

In some embodiments, the gradient reduction value sequence may be related to the predicted time of the appearance of a next object. For example, the longer the predicted time of appearance of a next object, the fewer a count of elements in the gradient reduction value sequence and the larger a sum of the elements (but the irradiation intensities of the street lamps may not be reduced below the lowest intensity values), so that the irradiation intensities of the street lamps may decrease rapidly. The shorter the prediction time of appearance of a next object, the more the count of elements in the gradient reduction value sequence and the smaller the sum of elements, so that the irradiation intensities of the street lamps slowly decrease.

In some embodiments, the sequence of gradient reduction values may also be related to the speed of appearance of a next object. For example, the longer the predicted time of the next appearance of an object and the smaller a speed of the appearance of a next object, the fewer the count of elements in the gradient reduction value sequence and the larger the sum of the elements. The shorter the predicted time of the appearance of a next object and the higher the speed of the appearance of a next object, the more the count of elements in the gradient reduction value sequence and the smaller the sum of the elements.

In some embodiments of the present disclosure, when determining the gradient reduction value sequence, by introducing a correlation of the speed of the appearance of a next object, it may be possible to effectively prevent a situation that a speed of a vehicle coming next time is fast and the irradiation intensities of the street lamps have been rapidly reduced, thereby reducing a risk of traffic accidents.

In some embodiments of the present disclosure, by introducing a gradient reduction value sequence and sequentially assigning the elements in the gradient reduction value sequence to the irradiation intensity reduction values, the irradiation intensities of the street lamps may be gradually reduced, so as to realize gradient control and help adapt to more variable and complex road scenes.

In some embodiments of the present disclosure, it is judged whether there is an object on the road through the sensing information acquired by the second sensor. When there is no object and the duration satisfies the preset condition, the irradiation intensities of the street lamps may be reduced, which can save power resources. At the same time, a time of the appearance of a next object may be considered, which can prevent sudden arrival and reduce the accident risk.

It should be noted that the above description of the method of adjusting the irradiation intensities of the street lamps is only for example and explanation, and does not limit the scope of application of the present disclosure. For those skilled in the art, various modifications and changes may be made to the method of adjusting the irradiation intensities of street lamps under the guidance of the present disclosure. However, these modifications and changes are still within the scope of the present disclosure.

The basic concepts have been described above. Obviously, for those skilled in the art, the above detailed disclosure is only an example and does not constitute a limitation of the present disclosure. Although it is not explicitly stated here, those skilled in the art may make various modifications, improvements, and amendments to the present disclosure. Such modifications, improvements and amendments are suggested in the present disclosure, so such modifications, improvements and amendments still belong to the spirit and scope of the exemplary embodiments of the present disclosure.

Meanwhile, the present disclosure uses specific words to describe the embodiments of the present disclosure. For example, "one embodiment", and/or "some embodiments" mean a certain feature or structure related to at least one embodiment of the present disclosure. Therefore, it should be emphasized and noted that "one embodiment" or "an alternative embodiment" mentioned twice or more in different positions in the present disclosure does not necessarily refer to the same embodiment. In addition, certain features or structures in one or more embodiments of the present disclosure may be appropriately combined.

Similarly, it should be noted that, in order to simplify the description disclosed in the present disclosure and thus help the understanding of one or more embodiments of the invention, the foregoing description of the embodiments of the present disclosure sometimes incorporates a variety of features into one embodiment, the drawings or the description thereof. However, this disclosure method does not mean that the object of the present disclosure requires more features than those mentioned in the claims. In fact, the features of the embodiments are less than all the features of the single embodiments disclosed above.

Finally, it should be understood that the embodiments described in the present disclosure are only used to illustrate the principles of the embodiments of the present disclosure. Other deformations may also fall within the scope of the present disclosure. Therefore, as an example rather than a limitation, the alternative configuration of the embodiments of the present disclosure can be regarded as consistent with the teachings of the present disclosure. Accordingly, the embodiments of the present disclosure are not limited to those explicitly introduced and described in the present disclosure.

What is claimed is:

1. A method for parameter adjustment of street lamps in a smart city based on an Internet of Things (IoT), wherein the method is realized by a system for parameter adjustment of street lamps in the smart city based on the IoT, the system for parameter adjustment of street lamps in the smart city based on the IoT includes a user platform, a service platform, a management platform, a sensor network platform and an object platform, the method is executed by the management platform, comprising:
   issuing a data acquisition instruction to receive road images acquired by the object platform through the sensor network platform, and the object platform including a first sensor;
   issuing a parameter determination instruction to determine irradiation intensities of the street lamps on a road based on the road images;
   acquiring navigation routes of vehicles by communicating with navigation systems of the vehicles;
   determining road segments where the vehicles are coming and estimated times when the vehicles arrive at the road segments based on the navigation routes; and
   adjusting the irradiation intensities of the street lamps at the road segments in a preset time in advance according to the estimated times.

2. The method for parameter adjustment of street lamps in the smart city based on the IoT of claim 1, wherein the determining irradiation intensities of street lamps on the road based on the road images further comprises:

determining lanes where objects on the road are located and forward directions of the objects based on the road images;

determining a first target area based on the lanes and the forward directions; and adjusting irradiation intensities of street lamps in the first target area.

3. The method for parameter adjustment of street lamps in the smart city based on the IoT of claim 2, wherein the irradiation intensities are adjusted based on a first irradiation intensity adjustment value related to at least one of a count of objects in the first target area and forward speeds of the objects in the first target area.

4. The method for parameter adjustment of street lamps in the smart city based on the IoT of claim 1, wherein the method further comprises:

determining turn signal states of the vehicles on the road based on the road images;

determining a second target area based on the turn signal states; and adjusting irradiation intensities of street lamps in the second target area.

5. The method for parameter adjustment of street lamps in the smart city based on the IoT of claim 4, wherein the adjusting irradiation intensities of street lamps in the second target area comprises:

determining a second irradiation intensity adjustment value of a lane segment of a certain lane in the second target area using a preset algorithm: $L_2=k_1/d+k_2t$; wherein $L_2$ is the second irradiation intensity adjustment value, d is a distance between an object closest to the lane segment and the lane segment, t is a waiting time of a red light, and $k_1$ and $k_2$ are preset parameters for adjusting the second irradiation intensity adjustment value; the lane segment is entered by objects on the certain lane in the second target area through a left turn, a U-turn, or straight driving; and adjusting the irradiation intensities of the street lamps in the second target area based on the second irradiation intensity adjustment value.

6. The method for parameter adjustment of street lamps in the smart city based on the IoT of claim 1, wherein determining the irradiation intensities of the street lamps on the road further comprises:

receiving an ambient light intensity acquired by the object platform through the sensor network platform;

based on the road images, determining the road environment information using a first image recognition model; wherein the first image recognition model is a machine learning model and acquired through training, training samples include historical road images, and a label is road environment information corresponding to the historical road images; and determining the irradiation intensities of the street lamps on the road based on the ambient light intensity and the road environment information.

7. The method for parameter adjustment of street lamps in the smart city based on the IoT of claim 1, wherein determining the irradiation intensities of the street lamps on the road further comprises:

judging whether there is an object on the road according to sensing information acquired by a second sensor of the object platform, wherein the object includes a vehicle or a pedestrian;

controlling the street lamps on the road to reduce the irradiation intensities in response to an absence of the object on the road and a duration of the absence of the object satisfying a preset condition; wherein the preset condition is related to a predicted time when a next object appears on the road, and the predicted time is determined based on a time prediction model; and an input of the time prediction model includes a sequence of historical object appearance times, and an output of the time prediction model includes a prediction time; and the time prediction model is a machine learning model.

8. The method for parameter adjustment of street lamps in the smart city based on the IoT of claim 7, wherein the input of the time prediction model includes a sequence of speeds of historical objects, and the output of the time prediction model includes a speed of a next appeared object.

9. The method for parameter adjustment of street lamps in the smart city based on the IoT of claim 7, wherein the controlling the street lamps on the road to reduce the irradiation intensities in response to an absence of the object on the road and a duration of the absence of the object satisfying a preset condition comprises:

determining a gradient reduction value sequence based on the predicted time, wherein the gradient reduction value sequence is a sequence composed of at least one irradiation intensity reduction value of the street lamps;

determining the at least one irradiation intensity reduction value of the street lamps based on the gradient reduction value sequence; and controlling the street lamps on the road to reduce the irradiation intensities based on the at least one irradiation intensity reduction value of the street lamps.

10. The method for parameter adjustment of street lamps in the smart city based on the IoT of claim 9, wherein the gradient reduction value sequence is also related to a speed of a next appeared object; and the method further comprises:

determining the gradient reduction value sequence based on the predicted time and the speed of the next appeared object.

11. A system for parameter adjustment of street lamps in a smart city based on an Internet of Things (IoT), wherein the system includes a user platform, a service platform, a management platform, a sensor network platform and an object platform, and the management platform is configured to:

issue a data acquisition instruction to receive road images acquired by the object platform through the sensor network platform, and the object platform including a first sensor;

issue a parameter determination instruction to determine irradiation intensities of the street lamps on a road based on the road images;

acquire navigation routes of vehicles by communicating with navigation systems of the vehicles;

determine road segments where the vehicles are coming and estimated times when the vehicles arrive at the road segments based on the navigation routes; and adjust the irradiation intensities of the street lamps at the road segments in a preset time in advance according to the estimated times.

12. The system for parameter adjustment of street lamps in the smart city based on the IoT of claim 11, wherein the management platform is further configured to:

determine lanes where objects on the road are located and forward directions of the objects based on the road images;

determine a first target area based on the lanes and the forward directions; and adjust irradiation intensities of street lamps in the first target area.

13. The system for parameter adjustment of street lamps in the smart city based on the IoT of claim 12, wherein the irradiation intensities are adjusted based on a first irradiation intensity adjustment value related to at least one of a count of objects in the first target area and forward speeds of the objects in the first target area.

14. The system for parameter adjustment of street lamps in the smart city based on the IoT of claim 11, wherein the management platform is further configured to:

determine turn signal states of the vehicles on the road based on the road images;

determine a second target area based on the turn signal states; and adjust irradiation intensities of street lamps in the second target area.

15. The system for parameter adjustment of street lamps in the smart city based on the IoT of claim 14, wherein the management platform is further configured to:

determine a second irradiation intensity adjustment value of a lane segment of a certain lane in the second target area using a preset algorithm: $L_2=k_1/d+k_2$; wherein $L_2$ is the second irradiation intensity adjustment value, d is a distance between an object closest to the lane segment and the lane segment, t is a waiting time of a red light, and $k_1$ and $k_2$ are preset parameters for adjusting the second irradiation intensity adjustment value; the lane segment is entered by objects on the certain lane in the second target area through a left turn, a U-turn, or straight driving; and adjust the irradiation intensities of the street lamps in the second target area based on the second irradiation intensity adjustment value.

16. The system for parameter adjustment of street lamps in the smart city based on the IoT of claim 11, wherein the management platform is further configured to:

judge whether there is an object on the road according to sensing information acquired by a second sensor;

control the street lamps on the road to reduce the irradiation intensities in response to an absence of the object on the road and a duration of the absence of the object satisfying a preset condition; wherein the preset condition is related to a predicted time when a next object appears on the road, and the predicted time is determined based on a time prediction model; and an input of the time prediction model includes a sequence of historical object appearance times, and an output of the time prediction model includes a prediction time; and the time prediction model is a machine learning model.

17. The system for parameter adjustment of street lamps in the smart city based on the IoT of claim 16, wherein the input of the time prediction model includes a sequence of speeds of historical objects, and the output of the time prediction model includes a speed of a next appeared object.

18. The system for parameter adjustment of street lamps in the smart city based on the IoT of claim 16, wherein the management platform is further configured to:

determine a gradient reduction value sequence based on the predicted time, wherein the gradient reduction value sequence is a sequence composed of at least one irradiation intensity reduction value of the street lamps;

determine the at least one irradiation intensity reduction value of the street lamps based on the gradient reduction value sequence; and control the street lamps on the road to reduce the irradiation intensities based on the at least one irradiation intensity reduction value of the street lamps.

19. The system for parameter adjustment of street lamps in the smart city based on the IoT of claim 18, wherein the gradient reduction value sequence is also related to a speed of a next appeared object; and the management platform is further configured to:

determine the gradient reduction value sequence based on the predicted time and the speed of the next appeared object.

20. A non-transitory computer-readable storage medium, which stores computer instructions, when the computer instructions are executed by a processor, a method for parameter adjustment of street lamps in a smart city based on an Internet of Things is implemented, the method comprising:

by a management platform, issuing a data acquisition instruction to receive road images acquired by the object platform through the sensor network platform, and the object platform including a first sensor;

by the management platform, issuing a parameter determination instruction to determine irradiation intensities of the street lamps on a road based on the road images;

by the management platform, acquiring navigation routes of vehicles by communicating with navigation systems of the vehicles;

by the management platform, determining road segments where the vehicles are coming and estimated times when the vehicles arrive at the road segments based on the navigation routes; and by the management platform, adjusting the irradiation intensities of the street lamps at the road segments in a preset time in advance according to the estimated times.

* * * * *